United States Patent
Du et al.

(10) Patent No.: US 8,434,823 B2
(45) Date of Patent: May 7, 2013

(54) RECLINING SEAT ASSEMBLY

(75) Inventors: Robert Du, Canton, MI (US); Paul G. Ferraiuolo, Allen Park, MI (US); Jerry R. Brown, Northville, MI (US); Brian Haidar, Livonia, MI (US); Jerry J. Naujokas, Canton, MI (US)

(73) Assignee: Ford Global Technologies, Dearborn, MI (US)

( * ) Notice: Subject to any disclaimer, the term of this patent is extended or adjusted under 35 U.S.C. 154(b) by 695 days.

(21) Appl. No.: 12/505,441

(22) Filed: Jul. 17, 2009

(65) Prior Publication Data

US 2011/0012413 A1 Jan. 20, 2011

(51) Int. Cl.
A47C 1/25 (2006.01)
B60N 2/225 (2006.01)

(52) U.S. Cl.
USPC ................................ 297/362.11; 297/354.12

(58) Field of Classification Search ............. 297/362.11, 297/354.12
See application file for complete search history.

(56) References Cited

U.S. PATENT DOCUMENTS

| | | | |
|---|---|---|---|
| 5,156,439 A | 10/1992 | Idlani et al. | |
| 5,350,216 A * | 9/1994 | Ito | 297/362 |
| 6,168,235 B1 | 1/2001 | Freund | |
| 6,629,732 B1 * | 10/2003 | Ursel et al. | 297/362.11 |
| 6,712,429 B2 * | 3/2004 | Villarroel | 297/361.1 |
| 7,344,189 B2 | 3/2008 | Reed et al. | |
| 7,520,568 B2 * | 4/2009 | Hoshihara et al. | 297/367 R |
| 7,695,068 B2 * | 4/2010 | Maeda et al. | 297/362.11 |
| 7,726,742 B2 * | 6/2010 | Keyser et al. | 297/362 |
| 7,976,103 B2 * | 7/2011 | Gamache et al. | 297/362.11 |
| 8,052,215 B2 * | 11/2011 | Ito | 297/362.11 |
| 2007/0200408 A1 * | 8/2007 | Ohta et al. | 297/362.11 |

FOREIGN PATENT DOCUMENTS

| EP | 0 523 349 A1 | 1/1993 |
|---|---|---|
| EP | 0 523 349 B1 | 1/1993 |

* cited by examiner

*Primary Examiner* — David Dunn
*Assistant Examiner* — Tania Abraham
(74) *Attorney, Agent, or Firm* — Gigette M. Bejin; Jason Rogers; Robbie Harmer

(57) ABSTRACT

An eccentric free pivot for a reclining seat assembly may include a seat cushion, a seatback, a gear system, an input mechanism, a rod, and an eccentric pivot. The gear system may pivotally couple the seat cushion to the seatback. A rod extending generally across the seat assembly may be coupled to the gear system on one side and the eccentric pivot on the other side. When the gear system and/or input mechanism rotate the rod and eccentric pivot, this rotation causes the side of the seatback opposite the gear system and/or input mechanism to move up and down.

1 Claim, 5 Drawing Sheets

RECLINING SEAT ASSEMBLY

BACKGROUND

The present disclosure relates generally to reclining seat assemblies, and more particularly, to such a device having an eccentric free pivot.

Some traditional reclining seat assemblies use dual power recliners wherein a recliner is implemented on each side of a seat assembly. However, utilizing two power actuators for each reclining seatback increases vehicle cost and weight. The second actuator also complicates the packaging of other desirable seat features. In addition to the extra cost and weight, many dual actuating seat assemblies require means for synchronizing the rotation between the inboard and outboard pivots. If the two actuators fall out of synch, lateral seatback movement can worsen beyond the movement exhibited by the configuration in which a free pivot is used with a single actuator.

Therefore, in order to reduce cost and weight, a seat assembly may implement a single actuator on one side of the seat assembly in order to pivot the seatback. Such reclining seat assembly configurations may implement a gear system on the outboard side and a free pivot on the inboard side.

SUMMARY

A reclining seat assembly is provided according to embodiments disclosed herein. The reclining seat assembly may include a seat cushion, a seatback, a gear system, an input mechanism, a rod, and an eccentric pivot. The seatback and seat cushion may have inboard and outboard sides, and the seatback may pivotally connect to the seat cushion at these sides. The gear system may couple the seat cushion to the seatback on either the inboard or outboard side of the seat assembly. Rotation of the gear system may cause the seatback to rotate relative to the seat cushion. The input mechanism, allowing a passenger to control the angle of the seatback, may be coupled to the gear system. The rod may extend between the inboard and outboard sides of the seat assembly, with a driven end of the rod coupled to the gear system and/or input mechanism.

An eccentric pivot may attach to the end of the rod opposite the driven end. The eccentric pivot may also pivotally connect to one side of the seatback. If the gear system and/or input mechanism are located on the outboard side of the seat assembly, the eccentric pivot may be located at the inboard side of the seat assembly, and vice versa. When the gear system and/or input mechanism rotate the driven end of the rod, rotation of the rod causes the opposite end of the rod to rotate an eccentric adaptor within the eccentric pivot. Rotation of the eccentric adaptor may in turn cause the inboard seat side to move simultaneously with the outboard seat side.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
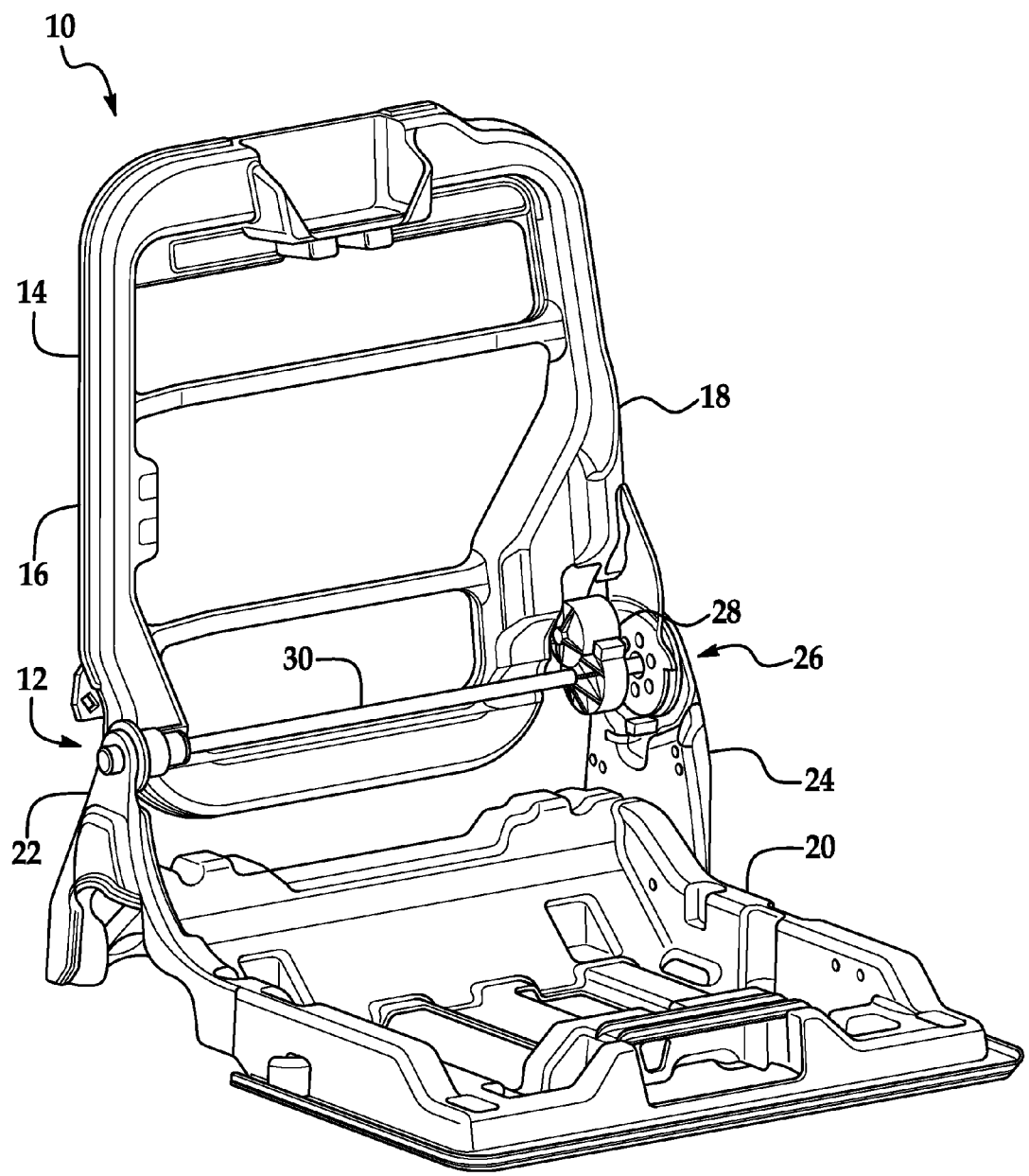
FIG. 1 is an isometric view of a reclining seat assembly in an upright position having an eccentric free pivot and a power reclining actuator.

In reducing the cost of a design, it is still desired to maintain a high quality and robust design. The inventors of the present disclosure have therefore discovered that an undesirable wobbling effect occurs in the seatback when an actuator or gear system is implemented on only one side of a vehicle seat. The gear system 26 in a reclining seat assembly may rotate eccentrically due to the design configuration of the pivoting, or core joints.

Accordingly, when a passenger pivots such a seatback, the gear system mounted on the one side of the seatback (such as the outboard side), may eccentrically rotate the seatback at the gear system joint as the seatback is rotated relative to the seat cushion frame. The free pivot, on the other hand, maintains the inboard side of the seatback in a vertically-fixed position. Therefore, when pivoted, the seatback may appear to wobble since only the gear-driven side of the seatback is moving up and down (eccentrically rotating) when pivoted.

Accordingly, the present disclosure eliminates the wobbling effect that occurs when a single gear system is implemented on a seat by providing a reclining seat assembly 10 in an automotive vehicle. In a manual reclining configuration, the reclining seat assembly 10 of the present disclosure eliminates undesirable wobbling in the seatback when a passenger pivots a seatback 14. In a power reclining configuration, the reclining seat assembly 10 eliminates both the undesirable wobbling and the need for a second power reclining actuator. The reclining seat assembly 10 disclosed herein substantially and advantageously overcome at least the potential drawbacks noted above.

Referring now to the non-limiting examples shown in FIGS. 1-10 together, the reclining seat assembly 10 having an eccentric free pivot 12 (or adaptor 12) may generally be mounted within a passenger compartment of an automotive vehicle (not shown). As described in further detail below, the reclining seat assembly 10 may be provided in both manual and power configurations. The reclining seat assembly 10 may be implemented in a variety of ways. For example, the reclining seat assembly 10 may be used with a seatback that rotates ten degrees or with a seatback that rotates 180 degrees. Though various components of the reclining seat assembly 10 are depicted on particular sides of the reclining seat assembly 10, it is to be understood that the FIGS. 1-10 are merely exemplary and therefore, non-limiting. Components of the reclining seat assembly 10 may be manufactured in a reflective inboard/outboard configuration depending on packaging constraints, placement within the vehicle, passenger controls, and the like.

Referring now to FIG. 1, the reclining seat assembly 10 is shown having the eccentric free pivot 12. A first seat member 14 (shown as seatback 14 in the non-limiting example illustrated in FIG. 1) includes a first side 16 which is spaced apart from a second side 18. The first seat member 14 may pivotally attach to a second seat member 20 (shown as a seat cushion frame in FIG. 1) at a first mount 82 and a second mount 24. The first seat member 14 is shown upright in FIG. 1. The second seat member 20 may secure to one or more vehicle body structures (not shown). The first side 16 of the first seat member 14 may pivotally attach to the first mount 82 of the second seat member 20 via the eccentric free pivot 12. The second side 18 of the first seat member 14 may pivotally attach to the second mount 24 via a gear system 26. The gear system 26 may be configured to eccentrically pivot the first seat member 14 through a range of angular positions.

Reclining seat assembly 10, shown as a powered seat configuration in FIG. 1, may include a power reclining actuator 28 that selectively rotates a rod 30 extending between the gear system 26 and the eccentric free pivot 12 or adaptor 12. The power reclining actuator 28 may electrically connect to an input mechanism such as a button (not shown). When a passenger operates the input mechanism, the power reclining actuator 28 may rotate the gear system 26, which in turn causes rotation in the rod 30 and the eccentric free pivot 12. Rotation of the gear system 26 may cause the first seat member 14, and more specifically, the second side 18 of the first seat member 14 to pivot eccentrically relative to the second seat member 20 which remains fixed. Due to the eccentricity in the gear system 26, the second side 18 of the first seat member 14 may move vertically up and down as the gear system 26 pivots the first seat member 14 through a range of angular positions.

Note that once the first seat member 14 pivots more than forty-five degrees forward or backward from an upright position, the up-down motion caused by the gear system 26 is more properly referred to as "front-back" motion. However, for the sake of continuity, the present disclosure will consistently refer to eccentric motion in the gear system 26 as up-down motion. To parallel and match this up-down motion generated in the second side 18 of the first seat member 14, the eccentric free pivot 12 is implemented on the first side 16 of the first seat member 14 to move the first side 16 up and down substantially synchronously with the second side 18.

Figure 2:
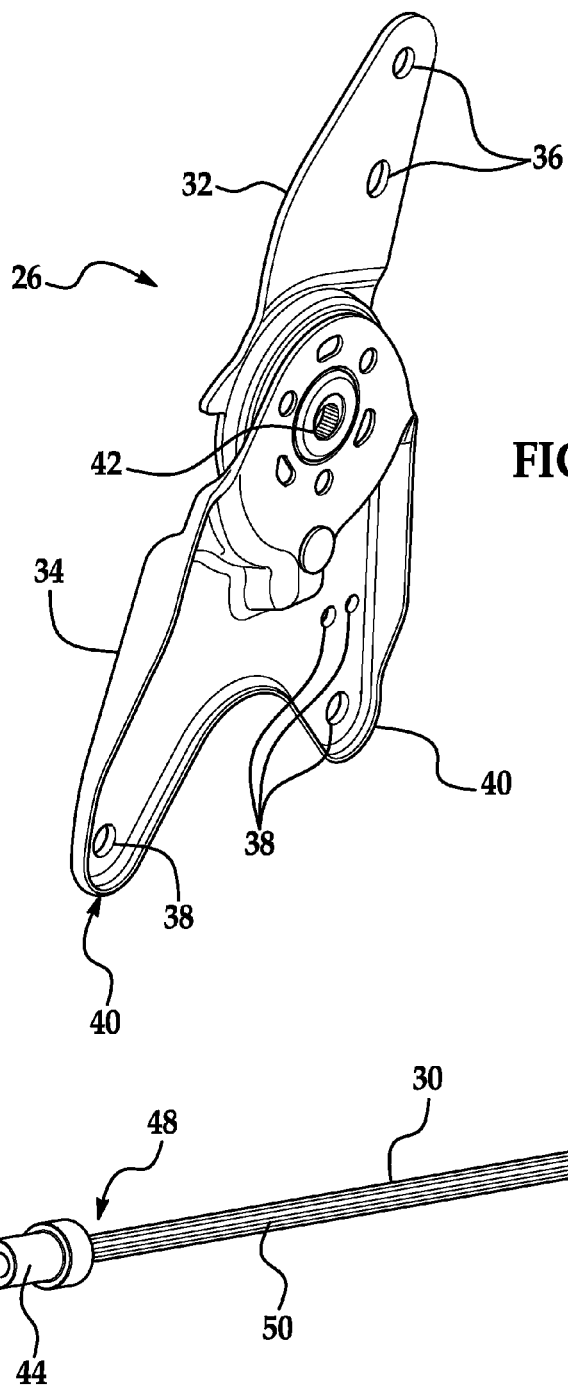
FIG. 2 is an isometric view of a gear system that may be part of a reclining seat assembly.

Referring to FIG. 2, a non-limiting example gear system 26 is shown in more detail. Gear system 26 may have a top bracket 32 and a bottom bracket 34. To provide eccentric motion, one skilled in the art should recognize that the top bracket 32 and the bottom bracket 34 may pivotally attach in eccentric fashion. The top bracket 32 may have apertures 36 facilitating attachment to the second side 18 of the first seat member 14 as shown in FIG. 1. Likewise, the bottom bracket 34 may have apertures 38 facilitating attachment to the first side 16 of the first seat member 14. The bottom bracket 34 may have spaced apart protrusions 40 that enhance the stability of the reclining seat assembly 10 by spacing apart the apertures 38, and hence the attachment points, of the gear system 26. The gear system 26 may also have a slot 42 for receiving and/or attaching the rod 30 shown in FIG. 1.

In one embodiment, the top bracket 32, having the second side 18 of the first seat member 14 attached, may pivot relative to the bottom bracket 34, which remains fixed along with second seat member 20. In addition to this pivotal movement, the top bracket 32 may move up and down relative to the bottom bracket 34 while the top bracket 32 is being pivoted or rotated. This eccentric motion in the gear system 26, as discussed above, causes the second side 18 of the first seat member 14 to repeatedly move up and down when pivoted.

Figure 3:
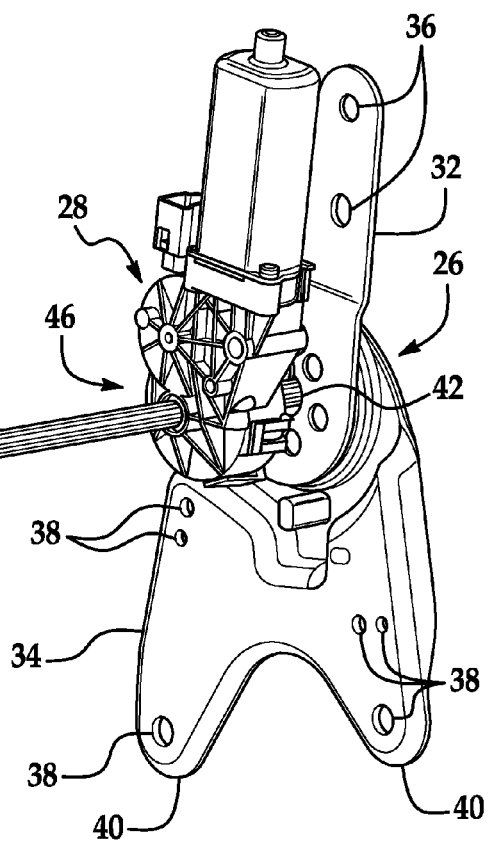
FIG. 3 is a partial isometric view of a reclining seat assembly that shows how a rod, a power reclining actuator, a gear system, and an eccentric free pivot may be assembled.
Figure 4A:
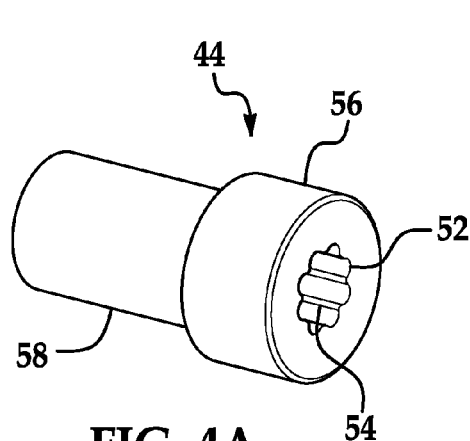
FIGS. 4A and 4B are non-limiting exemplary, enlarged perspective views of an eccentric free pivot.
Figure 4B:
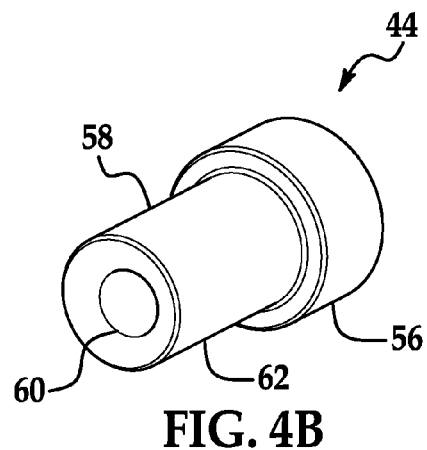

With respect to FIG. 3, the rod 30 is shown extending between the slot 42 of the gear system 26 and an eccentric adaptor 44, which is shown more closely in FIGS. 4A and 4B. A driven end 46 of the rod 30 may be located near the power reclining actuator 28 and the gear system 26. A distal end 48 of the rod 30, opposite the driven end 46, may affixed to the eccentric adaptor 44 as shown in FIG. 3. The rod 30 may have a serrated periphery 50, a shaped periphery such as an oval (not shown) or it may have a smooth periphery (not shown). The serrated periphery 50 shown in FIG. 3 may facilitate the power reclining actuator 28 and the gear system 26 to torque the driven end 46 of the rod 30. The serrated periphery 50 may also facilitate the rod 30 to subsequently transfer the torque delivered from the power reclining actuator 28 and the gear system 26 to the eccentric adaptor 44.

The rod 30 may experience two degrees of motion. First, the rod 30 may rotate about its central axis. Second, the rod 30 may also follow a path of the gear system 26. With regard to the first degree of motion, the rod 30 may not necessarily rotate at the same angular velocity as the top bracket 32. For example, the rod 30 may complete a full 360 degree rotation for every ten degrees that the top bracket 32, the second side 18, and the first seat member 14 pivot. The ratio of angular velocities in the rod 30 compared to the first seat member 14 may depend on the particular seat assembly and the desired range of motion. The second range of motion in the rod 30 corresponds to the up-down movement seen in the top bracket 32 and hence the second side 18 of the first seat member 14.

Now referring to FIGS. 3, 4A, and 4B, the eccentric adaptor 44 may attach to the distal end 48 of the rod 30. The distal end 48 may be welded, press-fitted, or mechanically affixed, or the like into a rod aperture 52 of the eccentric adaptor 44. It is also to be understood that the eccentric adaptor 44 may be formed integral with the rod 30. The rod aperture 52 of the eccentric adaptor 44 may have a serrated internal surface 54 that mates with the serrated periphery 50 of the rod 30. In any embodiment, the rod 30 may attach to the eccentric adaptor 44 such that rotating the rod 30 rotates the eccentric adaptor 44. The eccentric adaptor 44 may further comprise a thick portion 56 and a thin portion 58. In one embodiment, the thick portion 56 and the thin portion 58 may be circular as shown in FIGS. 4A and 4B. The eccentric adaptor 44 may also include a mount aperture 60 that is capable of receiving a mount 82 (shown as a bolt 82 in FIG. 6) in the eccentric free pivot 12. The eccentric adaptor 44 is placed on mount 82 operatively configured to freely rotate about mount 82. As shown in FIG. 4B, the mount aperture 60 may be offset from the center of the thin portion 58 of the eccentric adaptor 44. The mount aperture 60 may also be offset from the rod aperture 52 and the thick portion 56. Though it will be described in further detail below, the offset nature of the mount aperture 60 allows an outer surface 62 of the thin portion 58, and the eccentric adaptor 44 in general, to rotate eccentrically about an axis of a mount 82 (shown as a bolt in FIGS. 6 and 7) that may insert into the mount aperture 60 of the eccentric adaptor 12.

Figure 5:
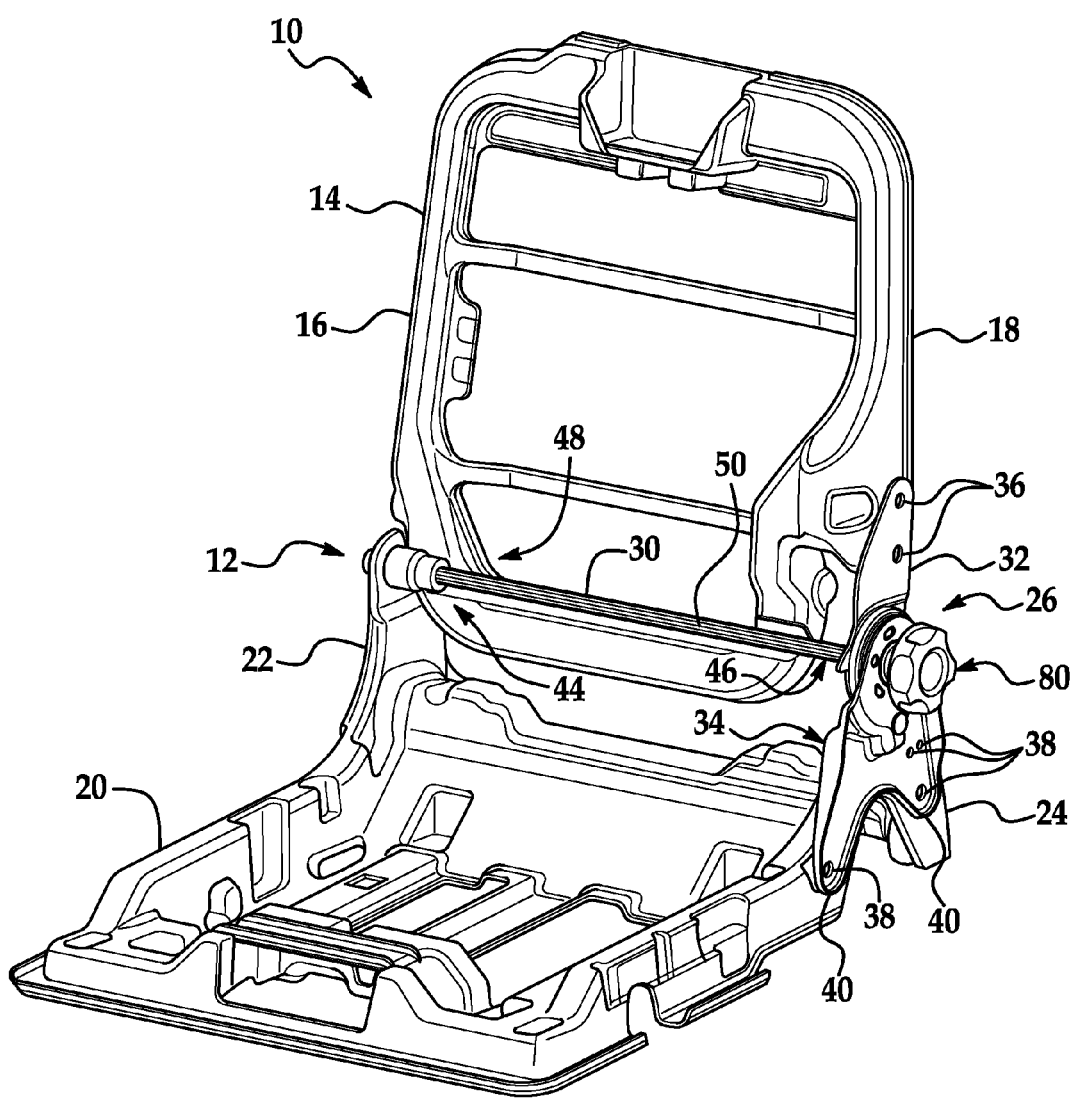
FIG. 5 is an isometric view of a reclining seat assembly in an upright position having an eccentric free pivot and a manual reclining knob.

Referring now to FIG. 5, the reclining seat assembly 10 is shown in a manual configuration. In the power configuration, a passenger may operate an input mechanism such as a switch or a button to cause the first seat member 14 to pivot. In the manual configuration, the reclining seat assembly 10 may implement an input member, such as a knob 80 or handle, that may be used to cause the first seat member 14 to pivot relative to the second seat member 16. The knob 80, therefore, may operatively coupled the gear system 26.

In contrast to a powered seat system, the knob 80 of a manually operated seat system may release the fixed connection in the gear system 26 between the first seat member 14 and the second seat member 16 thereby allowing the passenger to pivot the first seat member 14 relative to the second seat member 16. Like the power configuration, the gear system 26 of a manually operated system (and its associated eccentric free pivot/adaptor 12) may operate in an eccentric fashion.

Figure 6:
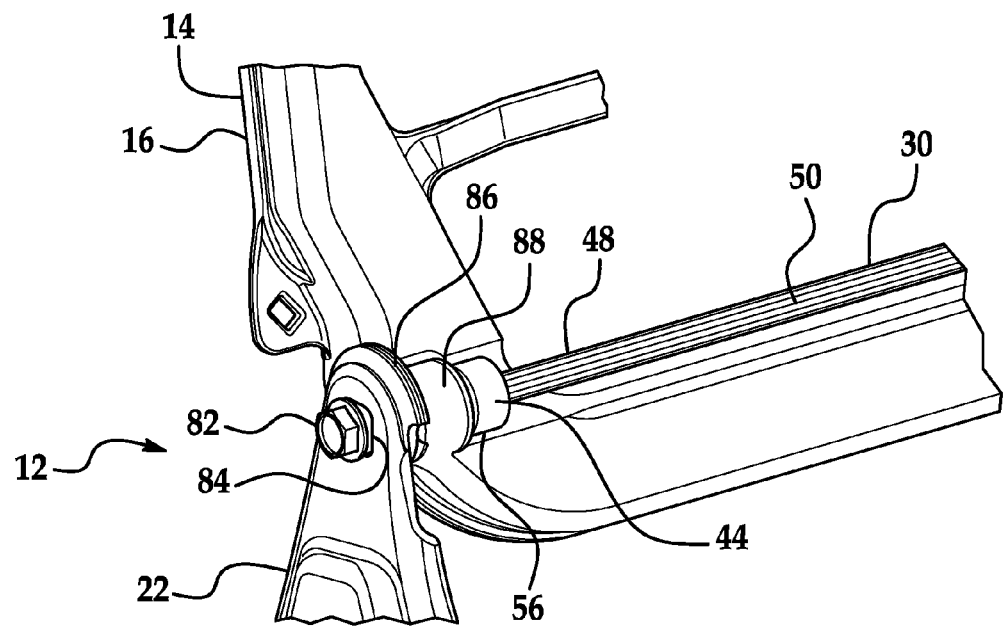
FIG. 6 is a partial isometric view of a reclining seat assembly showing where a seat cushion and a seatback may pivotally attach at an eccentric free pivot.
Figure 7:
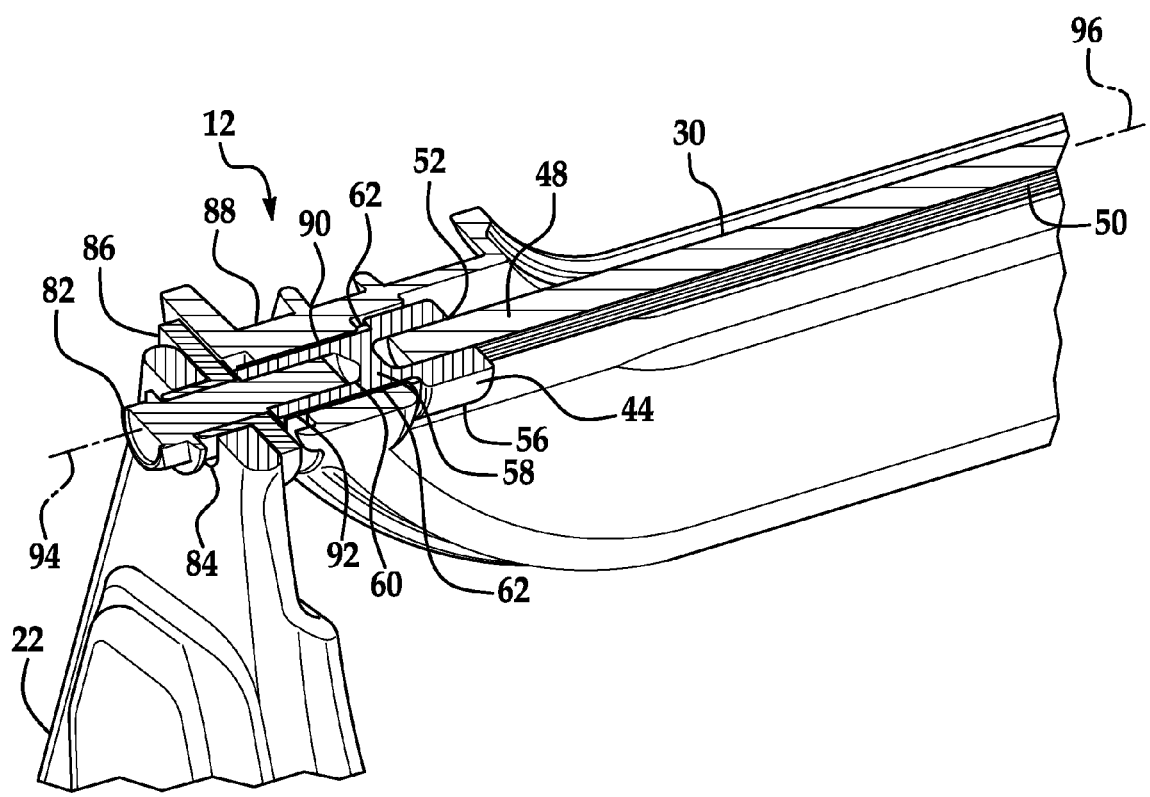
FIG. 7 is a cutaway perspective view of a portion of a reclining seat assembly with an eccentric free pivot in cross-section.

FIGS. 6-7 illustrate the reclining seat assembly 10 with the eccentric free pivot 12 having a first mount 82 (shown as a bolt 82) inserted through a slot 84 in the a vertical section 22 of the second seat member and extending into the mount aperture 60 of the eccentric adaptor 44. The first mount 82 may secure to threads within the mount aperture 60 such that the first mount 82 rotates in conjunction with the eccentric adaptor 44 and rotates freely within slot 84. It is also to be understood that first mount 82 may instead be fixed on the second seat member 16 such that the eccentric pivot 12 (or adaptor 12) freely rotates about the first mount 82. It is also to be understood that, where the first mount 82 rotates in conjunction with the eccentric adaptor 44 an adhesive (not shown) may be placed on the first mount 82 to more permanently secure the first mount 82 to the mount aperture 60 of the eccentric adaptor 44. As shown in the Figures, it is to be understood the rod-hole and bolt hole are off-set from one another. The distance between the centers of the rod-hole and the bolt hole may vary depending on the characteristics of the driving gear system.

A mount bushing 86 may also be implemented on the first mount 82. The mount bushing 86 may extend through the slot 84 in the vertical portion 22 of second seat member 16. The first mount 82 may pass through the mount bushing 86 such that the first mount 82 is free to rotate with the eccentric adaptor 44. The slot 84 in the vertical portion 22 may be noncircular to match the noncircular protrusion such that the mount bushing 86 is rotatably fixed even though the mount 82 and the eccentric adaptor 44 are free to rotate. The eccentric free pivot 12 may also comprise a receiver 88 having an opening 90 for a bracket bushing 92. Best shown in FIG. 7, the bracket bushing 92 may contain the thin portion 58 of the eccentric adaptor 44, allowing the thin portion 58 and its outer surface 62 to rotate freely within the bracket bushing 92. In one embodiment, the receiver 88 may be integrally formed with the first side 16 of the first seat member 14. In another embodiment, the receiver 88 may be fastened or welded to the first side 16 of the first seat member 14.

FIG. 7 shows a mount axis 94 that passes through the center of the mount 82. FIG. 7 also shows a rod axis 96, also referred to above as the central axis, that passes through the center of the rod 30. In one embodiment, the mount axis 94 may be offset from the rod axis 96. In operation, the mount 82 does not translate in any direction, but may rotate within the mount bushing 86 contained within the slot 84 of the vertical portion 22. When actuated, the rod 30 rotates the eccentric adaptor 44 about the mount axis 94. The eccentric adaptor 44 may rotate within the bracket bushing 92 in the first seat member 14. Since the mount aperture 60 and the rod aperture 52 of the eccentric adaptor 44 may be offset from one another, the rod 30, disposed in the rod aperture 52, may rotate eccentrically about the mount axis 94.

Figure 9:
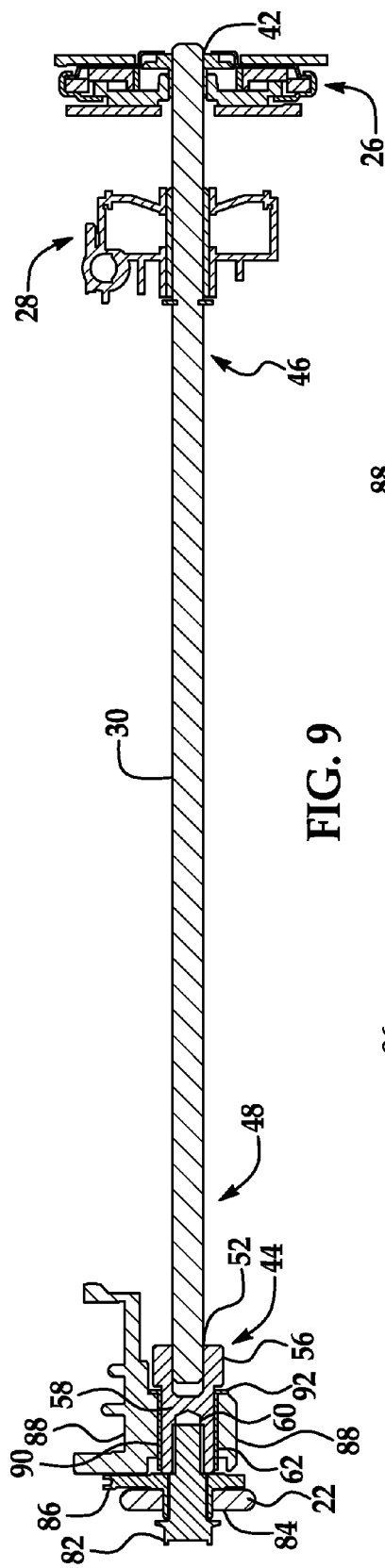
FIG. 9 is a cross-sectional view of a reclining seat assembly showing a gear system, a power reclining actuator, a rod, and an eccentric free pivot.
Figure 10:
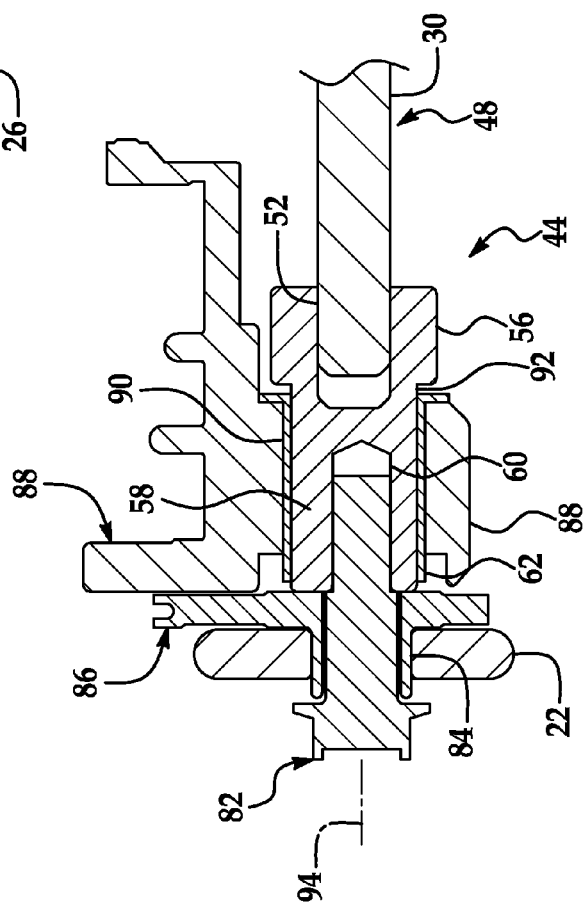
FIG. 10 is an enlarged cross-sectional view of an eccentric free pivot.
Figure 8:
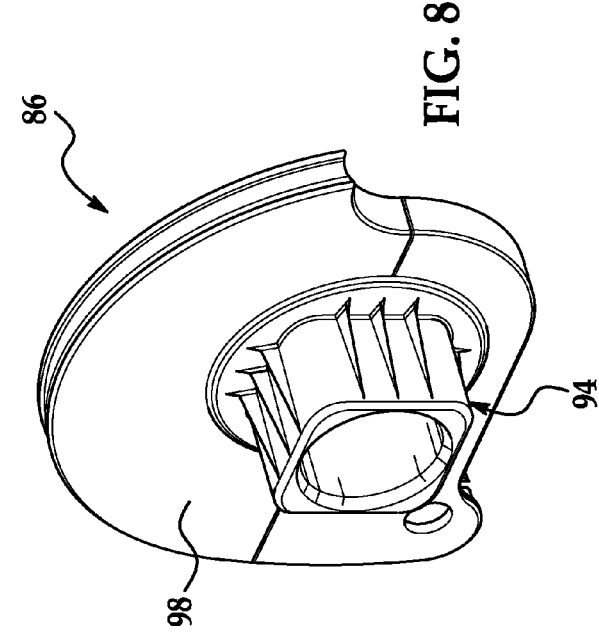
FIG. 8 is an enlarged isometric view of a plastic bushing that may be part of an eccentric free pivot.

Now referring to FIGS. 8-10 together, a non-limiting example of a mount bushing 86 and its arrangement is shown. The mount bushing may have a noncircular flange (or protrusion) 98 that extends through the slot 84 in the vertical portion 22. The noncircular flange (or protrusion) 98 may fit snugly within the slot 84 such that the mount bushing 86 is not free to rotate. Accordingly, the mount 82 may pass through the mount bushing 86 and the noncircular flange 98 such that the mount 82 is free to rotate. A reverse side (not shown) of the mount bushing 86 may also provide a low-friction surface such that the receiver 88 may move freely along the reverse side of the mount bushing 86. In another embodiment, the mount bushing 86 may be press fit into the slot 84 of the vertical portion 22.

Accordingly, a non-limiting example operation of the reclining seat assembly 10 may be described as follows. Power reclining actuator 28, or alternatively, knob 80 shown in FIG. 5, may actuate gear system 26 which in turn rotates the driven end 46 of the rod 30. The gear system 26 eccentrically pivots the first seat member 14 relative to the second seat member 16. The gear system 26 may cause the second side 18 to experience up-down movement. Rotation of the rod 30 may also cause the distal end 48 to rotate the eccentric adaptor 44. The eccentric adaptor 44, including the thin portion 58 and the outer surface 62, may in turn rotate the mount 82. The eccentric adaptor 44, including the thin portion 58 and the outer surface 62, may rotate about the mount axis 94. Rotation of the outer surface 62 may cause the bracket bushing 62 and the receiver 88 to move up and down relative to the vertical portion 22 (shown in FIGS. 7 and 10). The gear system 26 pivots the first seat member 14.

Accordingly, when a passenger pivots the first seat member 14, the eccentric adaptor 44 may engages with the receiver 88 of the first seat member 14 and hence the first side 16 of the first seat member 14 moves in conjunction with second side 18 of the first seat member 14.

FIGS. 1-10 show merely exemplary embodiments in which the eccentric free pivot 12 may operate. The present disclosure contemplates a variety of configurations in which a free pivot moves the non-driven end of a first seat member in similar fashion to the driven end. For example, bearings might be used in place of bushings. In another example, an eccentric or cam-like piece may be placed directly on the vertical portion 22 or the receiver 88. In yet another example, eccentric gears may facilitate the eccentric rotation at the non-driven side of a first seat member.

While multiple embodiments have been described in detail, it will be apparent to those skilled in the art that the disclosed embodiments may be modified. Therefore, the foregoing description is to be considered exemplary rather than limiting.

What is claimed is:

1. A reclining seat assembly comprising:
   a first seat member having a bolt and a second mount;
   a second seat member pivotally affixed to the first seat member, the second seat member having an inner side and a lateral side wherein the inner side is spaced apart from the lateral side;
   a gear system operatively coupling the lateral side of the second seat member to the first seat member at the second mount, the gear system operatively configured to rotate the second seat member relative to the first seat member;
   an actuator coupled to the gear system to move the second seat member between the plurality of angular positions;
   a rod generally extending between the lateral side and the inner side of the second seat member, the rod having a driven end and a distal end wherein the driven end is operatively coupled to the gear system at the lateral side of the second seat member; and an eccentric adaptor affixed to the distal end of the rod, the eccentric adaptor defining a mount aperture on a lateral side of the eccentric adaptor and the eccentric adaptor defining a rod aperture on an interior side of the eccentric adaptor, the mount aperture being offset from the rod aperture at a fixed distance and at a fixed location relative to the rod aperture, the eccentric adaptor operatively configured to receive the bolt at the mount aperture and the rod aperture of the eccentric adaptor operatively configured to receive the distal end of the rod, wherein the eccentric adaptor rotates within an opening defined by the first seat member and the gear system rotates both the rod and the eccentric adaptor thereby causing the eccentric adaptor to engage with the inner side of the second seat member so that the inner side moves in conjunction with the lateral side.

\* \* \* \* \*